(12) United States Patent
Bollman

(10) Patent No.: US 6,748,119 B1
(45) Date of Patent: Jun. 8, 2004

(54) SYSTEMS AND METHODS FOR INTERACTIVELY USING AND TRAINING AN AUTOMATIC IMAGE PROCESSING TECHNIQUE

(75) Inventor: James E. Bollman, Williamson, NY (US)

(73) Assignee: Xerox Corporation, Stamford, CT (US)

( * ) Notice: Subject to any disclaimer, the term of this patent is extended or adjusted under 35 U.S.C. 154(b) by 693 days.

(21) Appl. No.: 09/703,675

(22) Filed: Nov. 2, 2000

(51) Int. Cl.[7] .................................................. G06K 3/40
(52) U.S. Cl. ...................................... 382/254; 382/311
(58) Field of Search .................................... 382/254, 260, 382/266–275, 309, 311, 155, 159; 358/518, 519–521, 532, 533; 345/700, 747

(56) References Cited

U.S. PATENT DOCUMENTS

| | | | |
|---|---|---|---|
| 5,363,209 A | 11/1994 | Eschbach et al. ............ 358/445 |
| 5,371,615 A | 12/1994 | Eschbach ..................... 358/515 |
| 5,450,217 A | 9/1995 | Eschbach et al. ............ 358/518 |
| 5,450,502 A | 9/1995 | Eschbach et al. ............ 382/169 |
| 5,581,370 A | 12/1996 | Fuss et al. ................... 358/447 |
| 5,612,902 A | 3/1997 | Stokes ......................... 364/526 |
| 5,854,850 A | * 12/1998 | Linford et al. .............. 382/128 |
| 5,978,519 A | 11/1999 | Bollman et al. ............. 382/282 |
| 6,014,469 A | * 1/2000 | Eschbach ..................... 382/261 |
| 6,097,853 A | * 8/2000 | Gu et al. ..................... 382/282 |
| 6,392,764 B1 | * 5/2002 | Eschbach et al. ........... 358/522 |
| 6,490,370 B1 | * 12/2002 | Krasinski et al. ........... 382/195 |
| 6,502,045 B1 | * 12/2002 | Biagiotti ...................... 702/66 |
| 6,529,616 B1 | * 3/2003 | Rasmussen et al. ........ 382/112 |
| 6,636,628 B1 | * 10/2003 | Wang et al. ................. 382/167 |

* cited by examiner

Primary Examiner—Yon J. Couso
(74) Attorney, Agent, or Firm—Oliff & Berridge, PLC

(57) ABSTRACT

A method and apparatus for interactively and automatically enhancing image data by modifying one or more features of an image. The method includes inputting image data representing an image to be modified, analyzing the image for features to be modified, automatically selecting one or more feature to be modified, determining a first degree of modification using a automatic image enhancement techniques or a stored user preference, reversibly modifying the image based on the selected image feature and the first degree of modification, showing the image before improvement, showing the image after improvement and allowing the user to further modify at least one feature of the image data.

14 Claims, 7 Drawing Sheets

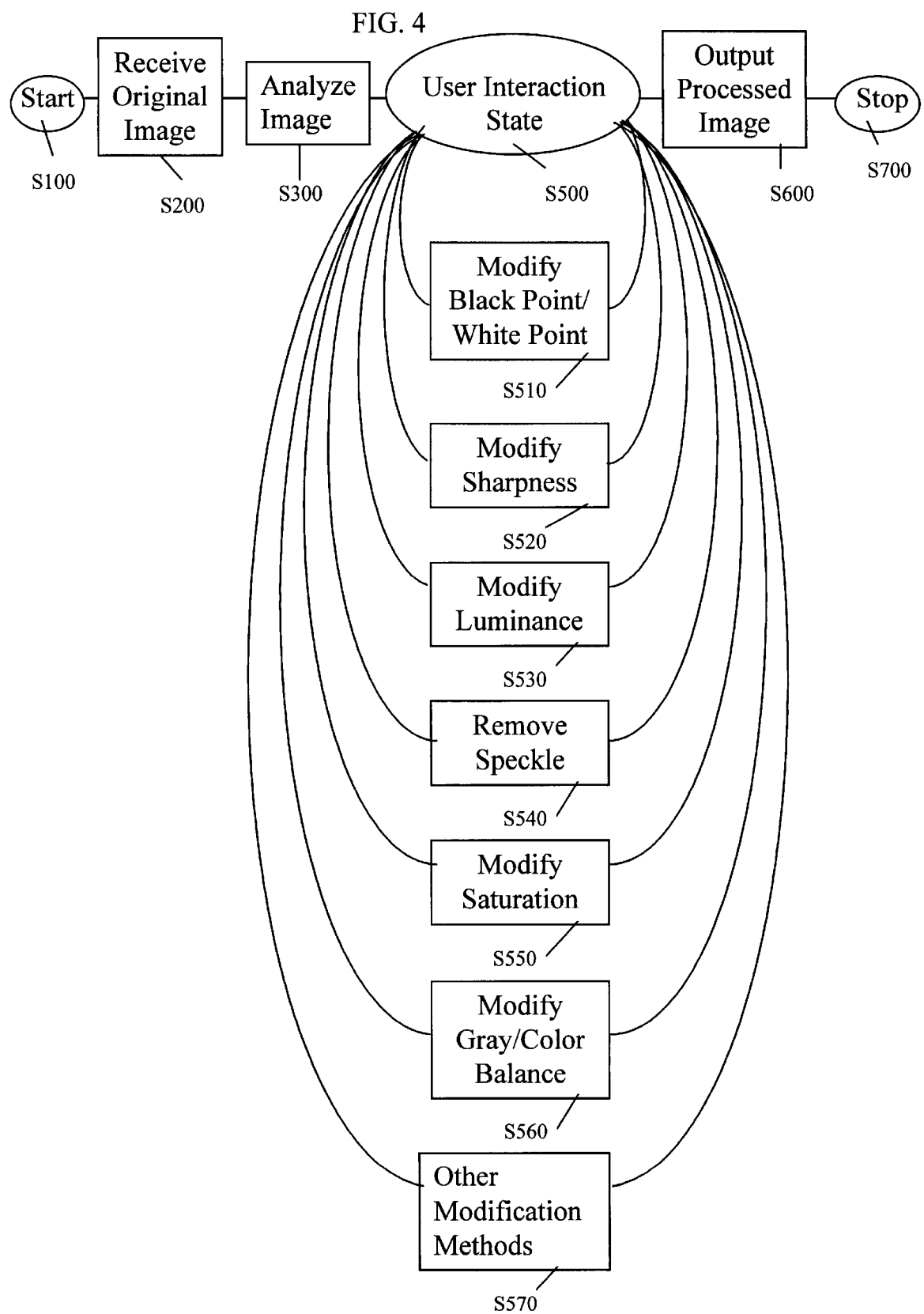

SYSTEMS AND METHODS FOR INTERACTIVELY USING AND TRAINING AN AUTOMATIC IMAGE PROCESSING TECHNIQUE

BACKGROUND OF THE INVENTION

1. Field of Invention

This invention relates to image processing.

2. Description of Related Art

Automatic image enhancement (AIE) techniques operate on sampled images and invoke image processing operations on the sampled images by analyzing the sub-sampled images. Automatic image enhancement techniques automatically modify images by adjusting exposure, contrast, sharpness, color balance and/or saturation. After analyzing the sampled image, automatic image enhancement techniques automatically determine conservative corrective actions, to perform on the image. The determined appropriate image processing is then applied to the image. Specifically, automatic image enhancement techniques can be performed in a fully automatic mode, where conservative image processing parameters can be chosen to ensure that the image quality does not get worse.

In the automatic image enhancement field, methods are known for modifying image data in various ways. U.S. Pat. No. 5,371,615 to Eschbach, U.S. Pat. No. 5,450,217 to Eschbach et al., U.S. Pat. No. 5,581,370 to Fuss et al., U.S. Pat. No. 5,450,502 to Eschbach et al., and U.S. Pat. No. 5,363,209 to Eschbach et al., each incorporated herein by reference in its entirety, disclose various automatic image enhancement techniques.

Alternatively, for high quality publication and printing, manually modifying image features may be preferred for artistic reasons. Specifically, a wide variety of software image enhancement applications are available that allow a skilled user to manually optimize image features so that a particular image may be tailored to match certain qualities desired by the user.

Lastly, it is known to use a genetic algorithm to modify an image on a random basis and use the results, as judged by a user, to modify the image modification in a series of modifications that are eventually acceptable to a user. One example of this method is PhotoGenetics, by QBeo Corporation.

SUMMARY OF THE INVENTION

This invention provides systems and methods that adjust automatic image modifications until a user accepts the results. This invention separately provides systems and methods that allow image modification to be adjusted to accommodate image data that regularly comes from a specific source and requires similar adjustments.

This invention separately provides systems and methods for adjusting the amount of user interaction so that the user can be trained or have better control over the output according to their skill level and time available.

The systems and methods according to this invention use known automatic image modification methods and systems for users that do not possess either the skill or the time to manually modify features to produce acceptable output. The systems and methods according to this invention add user input and interaction to automatic image enhancement. Alternatively, U.S. patent application Ser. No. 09/487,805, filed Jan. 20, 2000, incorporated herein in its entirety, relates to an automatic method for adjusting color quality. In the '805 application, an image is analyzed for various color problems, such as luminance differences, contrasting colors, etc. A user without the skill to manually modify images, but needing modifications other than the standard automatic image enhancement modifications to an image, can use the systems and methods of this invention to implement increased modifications to an image to produce results the user can accept.

In various exemplary embodiments of the systems and methods of this invention, differing numbers of adjustment parameters may be provided based on the user's skill level or time available. For example, speckle removal can be adjusted based on the size of the anomaly and the size of the comparison area. Accordingly, to remove speckle, the systems and methods of this invention can, for example, generically increase or decrease the speckle removal parameters, or allow the user to adjust the size of anomaly analyzed for and/or the comparison area used. In the increased adjustment parameter mode, the user is given a suggested anomaly size and a suggested comparison size. The user is then allowed to adjust these parameters based on experience and time constraints. The user can be trained using the systems and methods of this invention. The user's adjustment parameters can be adjusted by the user to fit individual preferences without requiring the user to determine starting values.

These and other features and advantages of this invention are described in or are apparent from the following detailed description of various exemplary embodiments of the systems, methods and graphical user interfaces according to this invention.

BRIEF DESCRIPTION OF THE DRAWINGS

The invention will be described in relation to the following drawings in which reference numerals refer to like elements, and wherein:

FIG. 4 is a flowchart outlining one exemplary embodiment of a method for modifying image data according to invention.

DETAILED DESCRIPTION OF PREFERRED EMBODIMENTS

Figure 1:
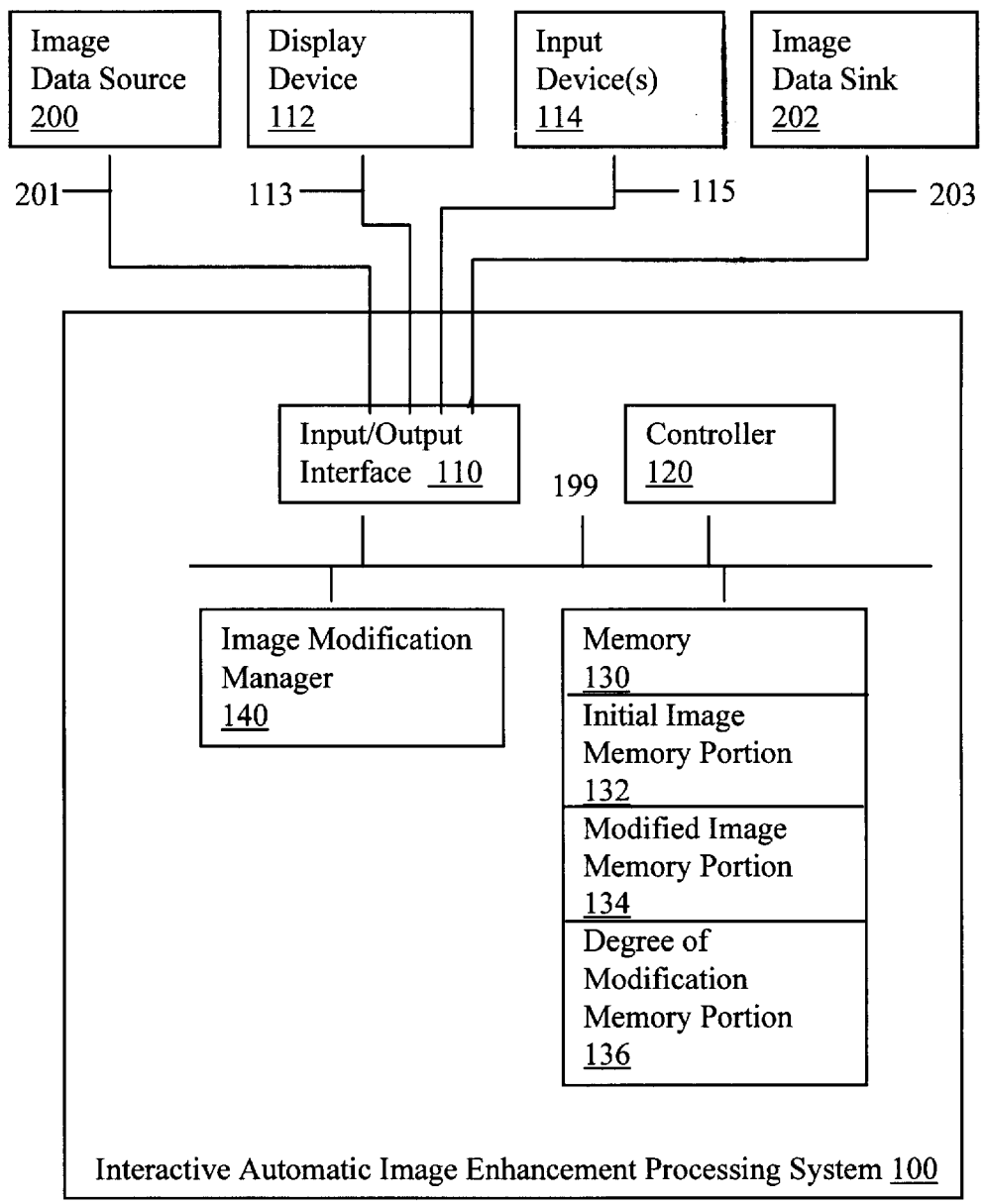
FIG. 1 is a block diagram of one exemplary embodiment of a system that modifies images according to this invention.

FIG. 1 shows a functional block diagram of one exemplary embodiment of an interactive automatic image enhancement processing system 100 according to this invention. As shown in FIG. 1, the image processing system 100 includes an input/output interface 110 that connects the image processing system 100 to an image data source 200 via a link 201, a display device 112 via a link 113, one or more input devices 114 via one or more links 115 and an image data sink 202 via a link 203. The image processing system 100 also includes a controller 120, memory 130, and an image modification manager 140, all connected via a link 199.

The controller 120 may be implemented as a main program circuit, a timer circuit, or an integrated circuit that calls the image modification manager 140, arranges the memory 130, and handles input/output events. Alternately, the system and apparatus may use an external controller (not shown) to handle generic functions, retaining the controller 120 to handle internal functions only.

The memory 130 includes one or more queues, stacks, address spaces, registers, files, arrays and buffers. As shown in FIG. 1, the memory 130 can include a initial image memory portion 132, a modified image memory portion 134 and a degree of modification memory portion 136. These memory portions 132–136 are exemplary embodiments of one way of storing the received image data and are intended to be illustrative and not limiting.

The image modification manager 140 modifies the image according to one or more implemented automatic image enhancement techniques, which can include any known or later developed automatic image enhancement techniques, such as those disclosed in the incorporated references. The image modification manager will make intelligent, conservative changes that generally improve image quality according to the standard automatic image enhancement protocol. The degrees and types of modifications can be stored in the degree of modification memory portion 136.

The image data source 200 provides image data to the input/output interface 110 over the link 201. Once the image data source 200 has transmitted the image data to the input/output interface 110, the input/output interface 110 stores, under control of the controller 120, the image in the initial image memory portion 132 of the memory 130.

The controller 120 scans the memory 130 for image data available to be processed. When the controller 120 determines that the initial image memory portion 132 contains such data, the controller 120 copies the data in the initial image memory portion 132 to the modified image memory portion 134. The controller 120 then invokes the image modification manager 140. The controller 120 copies the image data for the convenience of the system and so that the user can compare the current image and the modified image. Alternatively, the current image can be modified, losing the ability to compare the current and modified images. It should be appreciated that this is also within the scope of the invention.

The image modification manager 140 analyzes the image data in the modified image memory portion 134 to determine a first degree of modification according to the implemented automatic image enhancement. The image modification manager 140 may then modify the image data or not as discussed below. After the image modification manager 140 has completed its analysis and performed any determined modifications, if necessary, of the image data, the degree of modification determined and/or used may be stored in the degree of modification memory portion 136. Alternatively, the degree of modification may be stored within the image modification manger 140, or any other appropriate location.

Once the image modification manager 140 has automatically enhanced the image, the initial image, the modified image and the degree(s) of modification can be output through the input/output interface 110 to the display device 112. The user can then choose to make more radical changes to the image using the image modification manager 140 discussed above or any other appropriate circuit or software, such as those discussed below. Once the user has increased or decreased the amount of modification to the image so that it is acceptable to the user, the image is passed via the input/output interface 110 to the image data sink 202.

The interactive automatic image enhancement system 100 can then either save the degree(s) of modification stored in the degree of modification memory portion 136 for future use with similar types of images or as a new set of control parameters for the user. The degrees of modification may include boundaries for automatic image enhancement, additional or modified local control variables, and minimum and maximum allowable modifications. Alternatively, the degree of modification memory portion 136 can be cleared so that the user is initially provided with default modifications to the next image.

In various exemplary embodiments, the memory 130 is implemented using static or dynamic RAM. However, the memory 130 can also be implemented using a removable disk, a hard drive, flash memory or the like. Therefore, the memory 130 can be implemented using any appropriate combination of alterable, volatile or non-volatile memory or non-volatile or fixed memory.

The image data source 200 can be a digital camera, a scanner, a locally or remotely located computer, or any known or later developed device that is capable of generating electronic image data. Similarly, the image data source 200 can be any suitable device that stores and/or transmits electronic image data, such as a client or a server of a distributed network. The image data source 200 can be integrated with the interactive automatic image enhancement processing system 100, as in a digital copier having an integrated scanner.

The image data sink 202 can be any device or system that is capable of outputting or storing the processed image data generated by the interactive automatic image enhancement processing system 100. Thus, the image data sink 202 can be a printer, a copier or other image forming device, a hard drive, a facsimile device, a display device, a memory, or the like.

When the image data source 200 or image data sink 202 is physically separate from the interactive automatic image enhancement processing system 100, the links 201 and 203 can be any known or later developed connection device or structure, such as a connection over the public switch telephone number, a local area network, a wide area network, an intranet, an extranet, the Internet, or any other known or later distributed processing network. It should be appreciated that the links 201 and 203 can include both wired and wireless connection structures and devices.

It should be appreciated that while the electronic image data can be generated at the time of processing by the interactive automatic enhancement processing system 100, the electronic image data could have been generated at any time in the past.

Moreover, the electronic image data need not have been generated from an original physical document, view or physical embodiment, but could have been created from scratch electronically. The image data source 200 is thus any known or later developed device which is capable of supplying electronic image data over the link 201 to the interactive automatic image enhancement processing system 100.

The input devices 114 can include one or more of a mouse, a keyboard, a track ball, a track pad, a touch screen, or any other known or later developed device that a user can use to supply data and/or control signals to the interactive automatic image enhancement processing system 100. Similarly, the display device 112 can be a cathode ray tube, a LCD, a printer or any other known or later developed device that is capable of displaying the current and modified images in various graphical user interfaces according to this invention.

The links 113 and 115, while generally comprising a direct cable connection to the input/output interface 110, can be any known or later developed system or device for connecting the input devices 114 and/or the display devices 115, respectively, to the input/output interface 110, such as those devices discussed above with respect to the links 201 and 203.

FIG. 1 further shows the input/output interface 110, the controller 120, the image modification manager 140 and memory 130 connected by the link 199. The link 199, while generally comprising a data/control bus connecting the input/output interface 110, the controller 120, the image modification manager 140 and memory 130, can be any known or later developed system or device for connecting the devices, such as the links 201 and 203 discussed above.

Figure 2:
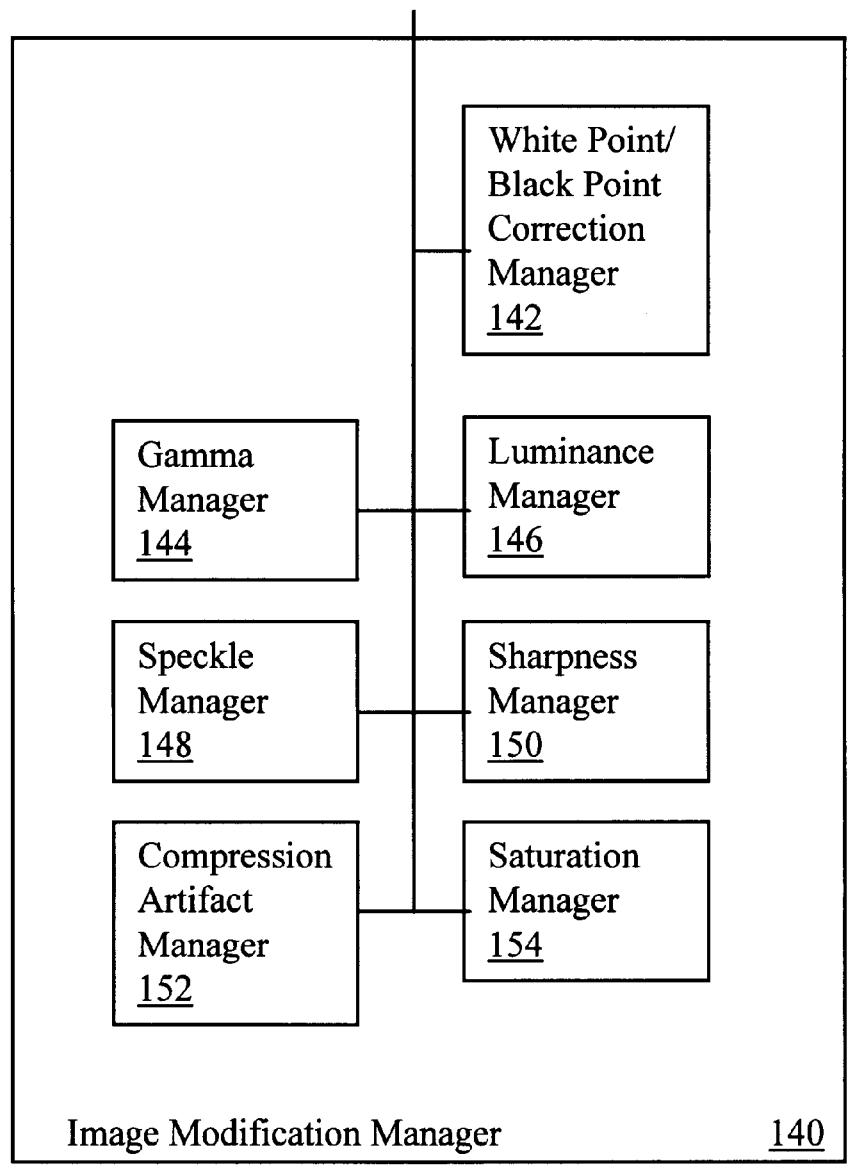
FIG. 2 is a block diagram of one exemplary embodiment of the image modification manager 140 of FIG. 1.

FIG. 2 shows a functional block diagram of one exemplary embodiment of the image modification manger 140 of FIG. 1 according to this invention. As shown in FIG. 2, the exemplary image modification manager 140 can include one or more of a white point/black point correction manager 142, a gamma manager 144, a luminance manager 146, a speckle manager 148, a sharpness manager 150, a compression artifact manager 152, and a saturation manager 154. The various managers 142–154 may use various ones of the automatic image enhancement methods and techniques disclosed in the incorporated references or any other known or later developed automatic image enhancement technique. For example, the sharpness manager 150 can use the automatic image enhancement method disclosed in the incorporated 209 patent to determine the maximum local contrast within the image, determine a filter value that increases local contrasts to a predetermined percentage of the maximum local contrast and applies a filter.

The image modification manager 140 does not need to include all of the various managers 142–154. The image modification manager 140 does not need to use all of the various managers 142–154 when analyzing a given image. Further, the image modification manager 140 can include other known or later developed automatic image enhancement methods without modifying the scope of the invention.

As shown in FIGS. 1 and 2, in various exemplary embodiments, the interactive automatic image enhancement processing system 100 is implemented using a programmed general purpose computer. Alternatively, each of the circuits shown in FIGS. 1 and 2 can be implemented as physically distinct hardware circuits within an ASIC, or using a digital signal processor, a FPGA, a PDL, a PLA, or a PAL, or using discrete logic elements or discrete circuit elements. The particular form of each of the circuits shown in FIGS. 1 and 2 will be a design choice and will be obvious and predictable to those skilled in the art.

Figure 3:
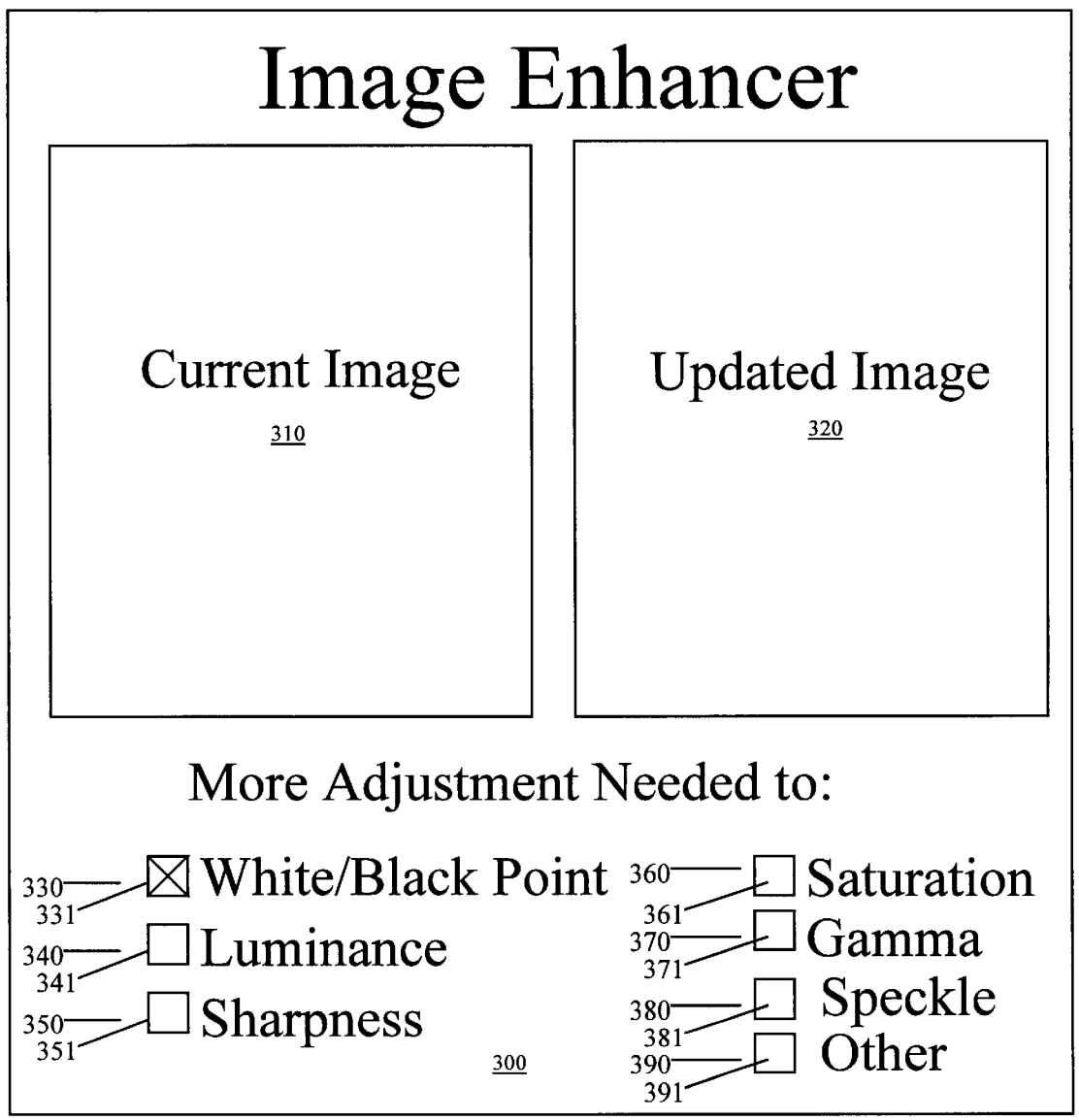
FIG. 3 is one exemplary embodiment of a graphical user interface that allows a user to interactively modify the adjustment parameters according to this invention.

FIG. 3 is an exemplary embodiment of an interactive automatic image enhancer graphical user interface 300. The graphical user interface 310 indicates an current image portion 310, an updated image portion 320 and various image modification portions 330–390. The user views the current image in the current image portion 310, the updated image in the updated image portion 320, and the selected image modifiers, including one or more of a white/black point modification portion 330, a luminance modification portion 340, a sharpness correction/modification portion 350, a saturation modification portion 360, a gamma modification portion 370, a speckle modification portion 380 and another modification portion 390.

The current image can be the image after an initial modification by automatic image enhancement, the image after additional modifications using the systems and methods of this invention, or the original, unmodified image.

The user can then decide to apply the recommended modifications by selecting a modification selection widget 331–391 of the corresponding modification portion 330–390. The image can be modified by the image modification manager 140 as discussed above. The user can then select additional modification to the image. The additional modifications can be generated by the appropriate ones of the modification managers 142–154 shown in FIG. 2, using increased modifications parameters to modify the image. Thus, a user can forcibly apply more radical changes than automatic image enhancement would normally provide.

Once the user finds the modified image acceptable, the user can save the modified image, have the modified image re-analyzed, output the image, or the like. The user can thus make the modified image into the current image and use the modified image as the current image. Thus the exemplary embodiment is meant to be illustrative and not limiting.

The embodiment shown in FIG. 3 uses check boxes as the selection widgets 331, 341, 351, 361, 371, 381 and 391. However, any known or later developed selection widgets, such as radio buttons, slider bars, toggle buttons, or other graphical interface objects can be used as the selection widgets. A recommendation can be applied immediately upon selecting a corresponding selection widget, or by selecting an "Apply" widget. It should be appreciated that Min/Average/Max, More/Original/Less, or other recommendation control metaphors are usable to select the levels or amounts of further (or lesser) modification to be forcibly applied to the modified image.

The exemplary embodiment of the graphical user interface 310 shown in FIG. 3 has the current image portion 310 placed next to the updated image portion 320 in a split screen arrangement. Other arrangements, such as tabs, multiple images or other embodiments may be used to display the image before and after modification. Additionally, only the current image portion 310 or only the modified image portion 320 can be shown and used.

In the exemplary embodiment of the graphical user interface 300 shown in FIG. 3, the modification portions 330–390 are positioned beneath the current and modified image portions 310 and 320. It should be appreciated that the modification portions 330–390 can be positioned anywhere within the graphical user interface 300. Similarly, showing the modification portions 330–390 is optional. Various modifications to the graphical user interface 300 will be obvious to those skilled in the art.

FIG. 3 shows the white/black point correction portion 330, the luminance modification portion 340, the sharpness modification portion 350, the saturation modification portion 360, the gamma modification portion 370, the speckle modification portion 380, and the other modification portion 390 as automatic image enhancement methods as discussed below. The graphical user interface can show all implemented methods, only those methods that were used to create the modified image, or other techniques for organizing and displaying the modification methods for a user to select to modify the image.

Additionally, the managers may have differing levels of detail shown that allow a user to modify the image according to their skill level and time constraints. For example, speckle removal can be controlled as simply more or less speckle removal. Alternatively, speckle removal can be controlled by the reference size of the anomaly and the tone difference required to trigger analysis. Additional factors are disclosed in the incorporated automatic image enhancement references.

FIG. 4 is a flowchart outlining one exemplary embodiment of a method for interactively and automatically enhancing an input image according to this invention. Beginning in step S100, control continues to step S200, where image data representing an current image is received. The image data may be converted between formats, and a duplicate image may be created for modification and comparison with the current image. Other image preparation tasks may also be performed. Next, in step S300, the image data is analyzed. The image data may be analyzed using the implemented automatic image enhancement techniques. Then, in step S500, a user interaction state is invoked to allow the user to increase the amount of image modification applied if the automatic image enhancement techniques have not modified the image enough. These image modification techniques are performed, and repeated as necessary with the user's input.

Once the user has determined that no further image modification techniques are to be forcibly applied to the modified image, control continues to step S600, where the processed image data is output. In step S700, the method ends.

While in the user interaction state S500, depending on the particular inputs supplied by the user, control can jump to any one of steps S510–S570. In particular, in step S510, the black point and white point values of the modified image data are revised to further modify (or lesser the modifications to) the image. Control then jumps back to step S500. In step S520, the sharpness of the modified image is further modified. Control then again jumps back to step S500. Similarly, in step S530, the luminance of the modified image is further modified.

In step S540, speckle noise and possible other types of noise can be more aggressively removed. In step S550, the saturation of the various colors in the modified image is further modified. In step S560, the gray scale/color balance is further modified, while in step S570, any other desirable modification techniques can be further applied to the modified image. Control then continues to step S500 until the user determines the image is acceptable.

Figure 5A:
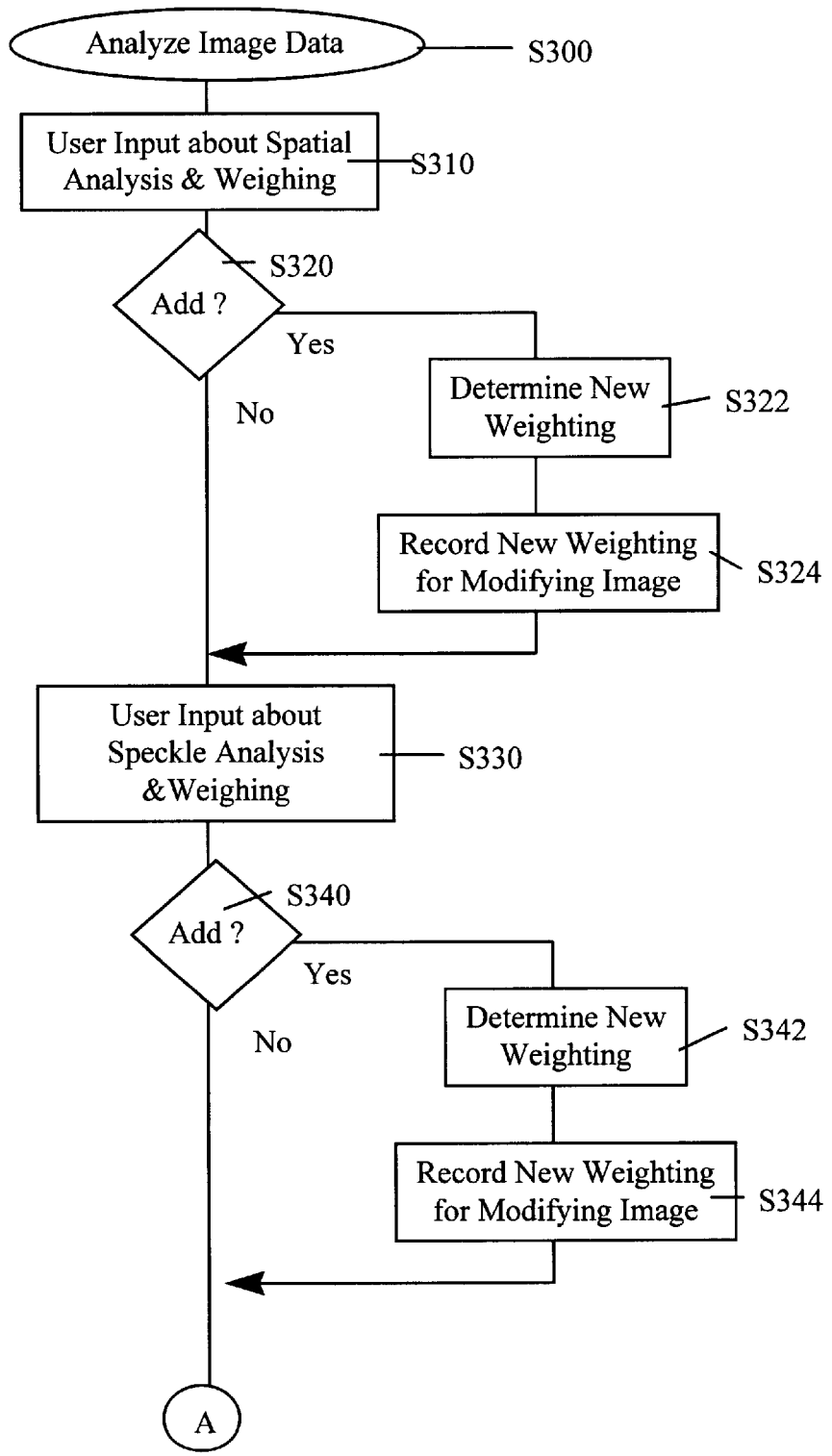
FIGS. 5A–5C are a flowchart outlining in greater detail one exemplary embodiment of the step of analyzing the image 500 of FIG. 4.
Figure 5B:
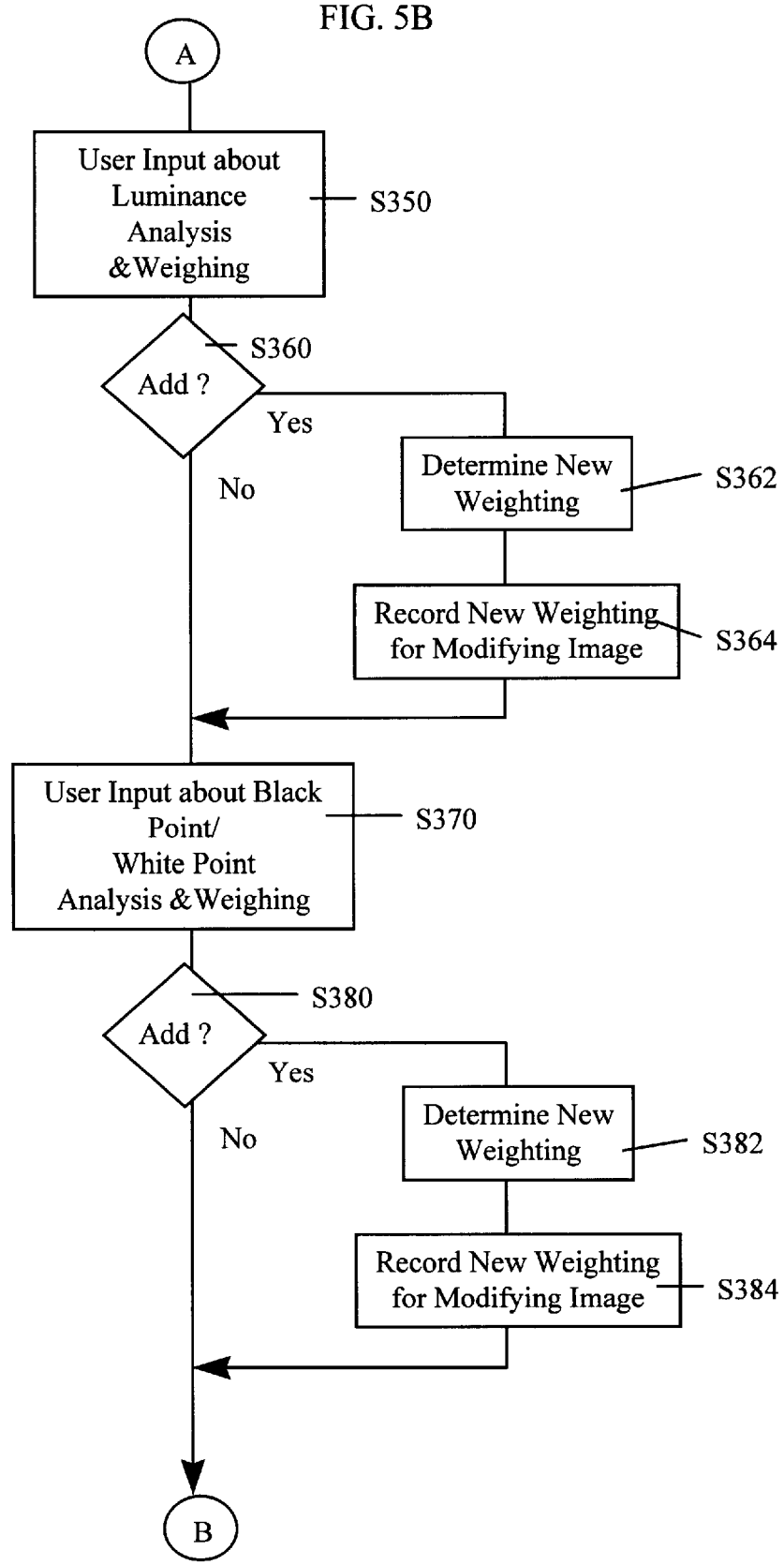
Figure 5C:
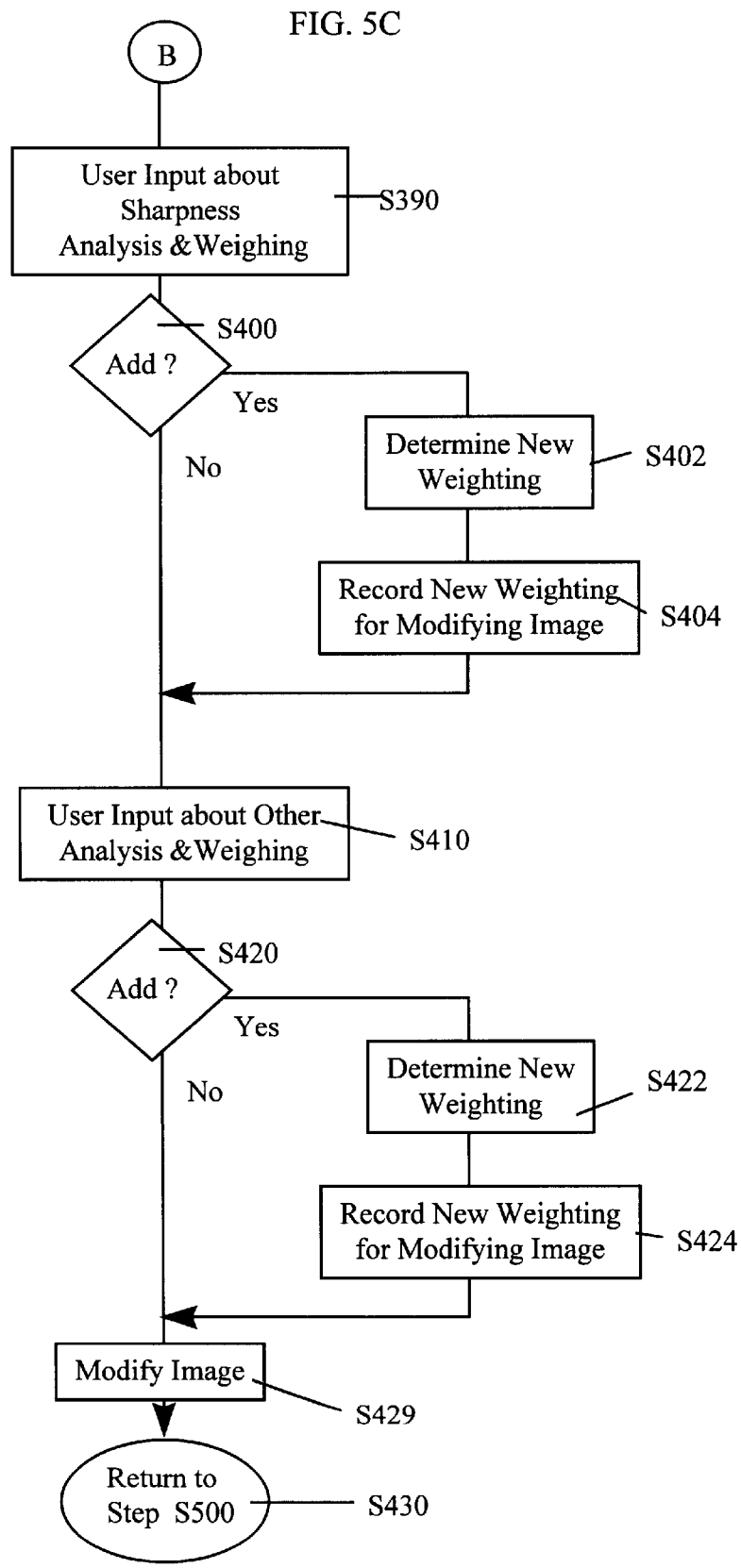

FIGS. 5A–5C are a flowchart outlining in more detail one exemplary embodiment of a method for modifying the image after automatic image enhancement has modified the image data of step S300. The process begins in step S300 and continues to step S310, where the image data is analyzed for spatial modifications. Next, in step S320, a determination is made whether to modify the image data. If the image data is to be modified, control continues to step S322. Otherwise, control jumps directly to step S330.

In step S322, modifications to the image data can be determined. Then, in step S324, the modification weighting, amounts or patterns used can be recorded. Control then continues to step S330.

In step S330, the image data is analyzed for speckle removal. Next, in step S340, a determination is made whether to modify the image data. If the image data is to be modified, control continues to step S342. Otherwise, control jumps directly to step S350.

In step S342, speckle removal in the image data can be determined. Next, in step S344, the speckle removal weighting, amounts or patterns used can be recorded. Control then continues to step S350.

In step S350, the image data is analyzed for luminance modifications. Next, in step S360, a determination is made whether to modify the luminance of the image data. If the image data is to be modified, control continues to step S362. Otherwise, control jumps directly to step S370.

In step S362, modifications to the luminance of the image data can be determined. Then, in step S364, the luminance modification weighting, amounts or patterns used can be recorded. Control then continues to step S370.

In step S370, the image data is analyzed for black point/white point correction. Next, in step S380, a determination is made whether to modify the image data. If the image data is to be modified, control continues to step S382. Otherwise, control jumps directly to step S390.

In step S382, black point/white point corrections to the image data can be determined. Next, in step S384, the black point/white point correction weighting, amounts or patterns used can be recorded. Control then continues to step S390.

In step S390, the image data is analyzed for sharpness modifications. Next, in step S400, a determination is made whether to modify the image data. If the image data is to be modified, control continues to step S402. Otherwise, control jumps directly to step S410.

In step S402, sharpness modifications to the image data can be determined. Then, in step S404, the sharpness modification weighting, amounts or patterns used can be recorded. Control then continues to step S410.

In step S410, the image data is analyzed for other types of image data modifications. Next, in step S420, a determination is made whether to modify the other types of image data. If the other types of image data can be to be modified, control continues to step S422. Otherwise, control jumps directly to step S429.

In step S422, other types of image data modifications to the other types of image data can be determined. Next, in step S424 the other types of image data modification weighting, amounts or patterns used can be recorded. Control then continues to step S429.

In step S429, the new weightings for modifying the image data are used to modify the image data. Control then continues to step S430, where control is returned to step S500.

The methods described herein are explained in linear fashion for clarity. It should be appreciated that the process may occur in a multitask, multithreaded or piped manner to enhance the speed and use of resources. Further, not all known methods for analysis and weighing have been discussed herein. Finally, the methods for analysis and weighting discussed herein need not all be included in the analysis and weighting methods described herein.

As used herein, the term "enhanced" connotes a condition where one picture condition is deemed better than another picture condition. It should be appreciated that it would always be possible to determine a better image. Similarly, the term "acceptable" connotes a condition where one value is deemed less desirable than another value. Again, it should be appreciated that it would always be possible to determine any different value. Accordingly, these terms are not intended to describe an ultimate or absolute condition. Rather, as recognized by one skilled in the art, these terms are intended to describe a condition that is relative to a desired level of accuracy.

In a second exemplary embodiment of the invention, the method described above may have increasing levels of user involvement in the modification of the image data. The user may be offered increasing levels of detail each time the image is modified. This allows the user to be trained by the system so that the user becomes proficient in image analysis and modification. This also allows a user that is experienced to fine-tune an image based on the user's preferences and time constraints.

For example, the initial modification may remove the standard amount of speckles according to automatic image enhancement techniques. The user may then force more speckle removal. As an additional step, the second embodiment may then offer the user the ability to choose the anomaly size, or the tone difference required for speckle analysis. Then, in addition iterations, more options may be offered to the user to fine tune the speckle removal algorithm.

By this embodiment, the algorithm may be taught user preferences, and the user may learn about image modification. Thus, when a user next modifies an image, the embodiment may apply the modification parameters applied previously as an initial modification. The modified degrees of modification may include new boundaries for automatic image enhancement, additional or modified local control variables, and minimum and maximum allowable modifications.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method for interactively modifying one or more features of an image, comprising:
    inputting image data representing an image to be modified;
    analyzing the image data for features to be modified;
    automatically selecting one or more feature to be modified;
    automatically determining a first degree of modification;
    modifying the image data based on the selected feature and the first degree of modification;
    displaying the modified image data; and
    allowing a user to further modify at least one selected feature of the image data until the displayed image data is in a desired condition.

2. The method of claim 1, further comprising making the modifications to the image data after modification permanent.

3. The method of claim 1, wherein the allowing the user to further modify is a choice of one or more of: Less/Original/More, Minimum/Average/Maximum, a series of radio buttons and a series of check boxes.

4. The method of claim 1, wherein the allowing the user to further modify has one or more adjusting parameters.

5. The method for of claim 4, wherein the number of parameters is used to train a user how to modify data in progressing levels of control over the results.

6. The method of claim 1, wherein the method for modifying data quality is one or more of: Spatial Filter, Luminance Enhancer, Speckle Filter, Gamma Enhancer, Sharpness Enhancer, Saturation Enhancer, Black Point/White Point Corrector and Gray/Color Balance Enhancer.

7. The method of claim 1, wherein determining the first degree of modification is done using a standard or a previously recorded user preference.

8. The method of claim 1, wherein the modifying the data step is done in a reversible manner.

9. The method of claim 1, wherein repeating the selecting, determining, modifying and displaying until the image data is in a desired condition comprises:
    determining, if the user rejects the modified data, a new degree of modification that provides a different level of modification than the first degree of modification;
    modifying the data based on the selected data feature and the new degree of modification;
    displaying the modified data; and
    repeating the determining, modifying and displaying, until the user accepts the modified data.

10. The method of claim 1, further comprising storing the one or more degrees of modification of the one or more features that the user accepted.

11. The method of claim 10, wherein the first degree of modification used is the previously stored degree of modification.

12. An apparatus for modifying one or more features of image data, comprising:
    a memory structure that stores image data and modification data;
    one or more processing circuits that selects one or more features and use automatic image enhancement methods on the selected one or more features;
    a display device that displays at least the modified image data;
    an input device for selecting and adjusting the automatic image enhancement methods to said at least one of the selected features.

13. The apparatus for modifying one or more features of the data of claim 12, wherein the processing circuit for modifying image data is at least one of a luminance management circuit, speckle filter management circuit, gamma management circuit, sharpness management circuit, saturation management circuit, black point/white point management circuit and gray/color balance management circuit.

14. An apparatus for modifying one or more features of the data of claim 12, wherein the storage means also stores the one or more degrees of modification of the one or more features that the user accepted.

* * * * *